(12) United States Patent
Peris et al.

(10) Patent No.: US 8,526,982 B1
(45) Date of Patent: Sep. 3, 2013

(54) SYSTEM FOR PROVIDING SERVICES BASED ON RELATIONSHIPS AND PROXIMITY

(71) Applicant: Cisco Technology, Inc., San Jose, CA (US)

(72) Inventors: Vinod Peris, Cupertino, CA (US); Pritam Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/670,066

(22) Filed: Nov. 6, 2012

(51) Int. Cl.
*H04B 7/00* (2006.01)

(52) U.S. Cl.
USPC ............................................ 455/466; 705/14

(58) Field of Classification Search
USPC .......... 455/466, 456.3, 456.1, 456.4; 705/10, 705/14, 400
See application file for complete search history.

(56) References Cited

U.S. PATENT DOCUMENTS

| 7,756,534 | B2 * | 7/2010 | Anupam et al. | .............. 455/466 |
| 8,290,516 | B2 | 10/2012 | Chandra et al. | |
| 2007/0270165 | A1 | 11/2007 | Poosala | |
| 2008/0281687 | A1 * | 11/2008 | Hurwitz et al. | ................. 705/14 |
| 2009/0298513 | A1 | 12/2009 | Hampel et al. | |
| 2010/0257556 | A1 | 10/2010 | Lee et al. | |

* cited by examiner

*Primary Examiner* — Phuoc Doan
(74) *Attorney, Agent, or Firm* — P. Su

(57) ABSTRACT

In one embodiment, a method includes identifying when a user device is in proximity to a moveable device, and determining a first amount of time the user device has been in proximity to the moveable device. The method also includes determining whether the first amount of time exceeds a threshold amount of time. When it is determined that the first amount of time exceeds the threshold amount of time, content associated with the moveable device is accessed. Finally, at least an indication of content is provided to the user device when it is determined that the first amount of time exceeds the threshold amount of time.

21 Claims, 5 Drawing Sheets

SYSTEM FOR PROVIDING SERVICES BASED ON RELATIONSHIPS AND PROXIMITY

TECHNICAL FIELD

The disclosure relates generally to wireless communications. More particularly, the disclosure relates to utilizing location information and/or relationships between a mobile provider and a consumer to provide appropriate services to the consumer.

BACKGROUND

Location based services generally identify a location of a person or a device, and use that location to provide information to the person or device. For example, the location of a person may be used to locate a nearest automatic teller machine (ATM) to the person and to inform the person of a location of the nearest ATM.

In some instances, once a location of a person is determined, location based services may allow the person to be offered discounts from establishments in the vicinity of the location of the person, or to be offered information about establishments in the vicinity of the location. An establishment in which a person has an interest, for example, may send a coupon that is valid at the establishment to the person, e.g., to a mobile phone owned by the person, when the person is located in the vicinity of the establishment. An establishment at which a person is located, for instance, may send information about the establishment to the person.

Typically, location based services are not dynamic in that certain information is available substantially only at a fixed location. By way of example, information provided to a person based on the location of the person generally includes substantially only information associated with entities which are fixed in the vicinity of the location.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
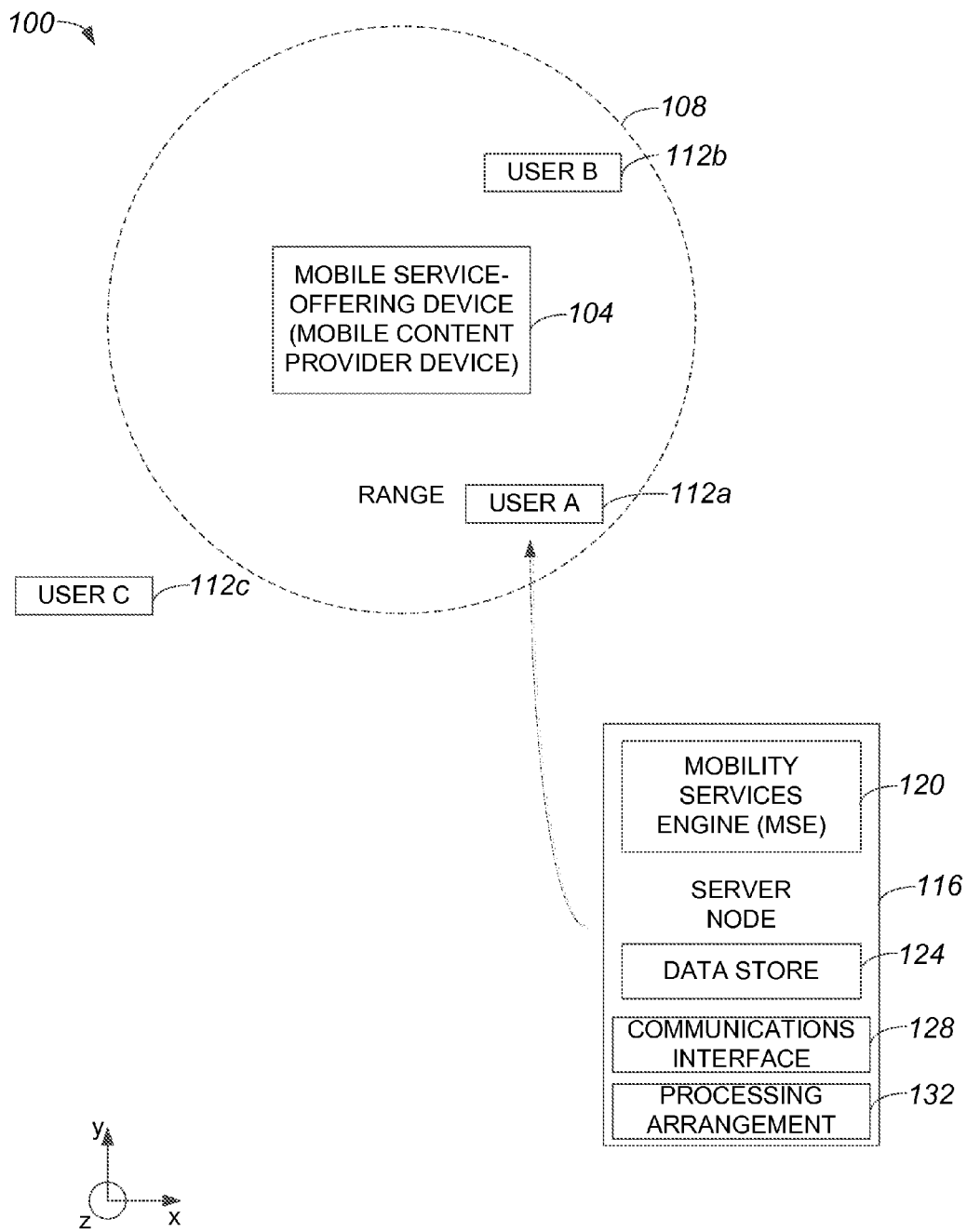
FIG. 1 is a diagrammatic representation of a network that includes a mobile provider, a plurality of users, and a server node that which has a mobility services engine (MSE) in accordance with an embodiment.

According to one aspect, a method includes identifying when a user device is in proximity to a moveable device, and determining a first amount of time the user device has been in proximity to the moveable device. The method also includes determining whether the first amount of time exceeds a threshold amount of time. When it is determined that the first amount of time exceeds the threshold amount of time, content associated with the moveable device is accessed. Finally, at least an indication of content is provided to the user device when it is determined that the first amount of time exceeds the threshold amount of time.

Description

Location-based services generally provide for a certain set of services to be available at a certain location. Such location-based services are not dynamic in nature, as the same set of services is generally available to all parties at the certain location. That is, location-based services are generally tied to particular physical locations.

Many entities that move may have services associated therewith. In other words, devices that provide or offer services may be moveable or mobile. Moveable or mobile devices that provide or offer services may include, but are not limited to including, hospital equipment such as sonography machines, coffee machines, computing equipment, presentation equipment, and/or conferencing equipment. Such mobile providers are often used by different parties, and the different parties may benefit from different information or services.

The ability to provide appropriate services to appropriate parties that would facilitate the use of mobile content providers by the parties. By way of example, when an electronic manual associated with the operation of a piece of equipment is presented on a user device when the user device is detected as dwelling near the piece of equipment, a user of the user device may be efficiently provided with information which may enable the user to successfully operate the piece of equipment. Similarly, when an application associated with the operation of a piece of equipment is provided on a user device, the application may be used to operate the piece of equipment.

Content or services associated with a mobile content provider may be provided to a user device when it is determined that a user device has dwelled, or otherwise substantially lingered, in proximity to the mobile content provider for more than a particular amount of time. Establishing a particular amount of time, e.g., a threshold amount of time, that a user device remains in proximity to a mobile content provider before content or services are provided to the user device increases the likelihood that content or services are provided to those who may appreciate the content or services. As those user devices in the possession of users who dwell near a mobile content provider are more likely to be interested in using or otherwise interacting with the mobile content provider, the users may be more likely to benefit from information and services provided to those user devices.

In addition to determining whether to provide content to a user device based on the proximity of the user device to a mobile content provider, a determination of whether to provide content may also be based on a relationship between the user device and the mobile content provider. For example, if a user device is associated with a vendor of the mobile content provider, content provided using the user device may be associated with maintaining, or performing maintenance on, the mobile content provider. On the other hand, if a user device is associated with a user of the mobile content provider, content provided using the user device may be associated with obtaining services from, or using, the mobile content provider.

In one embodiment, a vendor or manufacturer of a mobile content provider may create a manual or otherwise generate content that may be electronically available within a network.

Such information may be stored in a data store that may map content or a service to the mobile content provider, and may be provided to a user device when the user device is dwelling in proximity to the mobile content provider.

Referring initially to FIG. 1, a network that includes a mobile content provider, a plurality of users, and a server node which has a mobility services engine (MSE) will be described in accordance with an embodiment. A network 100, e.g., a communications network, includes a mobile service-offering device 104, a server node 116, and a plurality of user devices 112a-c. Network 100 may be a communications network within an enterprise or within a particular physical location, as for example an office building. Typically, mobile service-offering device 104 and user devices 112a-c may be known as being associated with network 100. That is, mobile service-offering device 104 and user devices 112a-c may be registered with network 100.

Mobile service-offering device 104 may generally be any mobile, or moveable, provider device that is arranged to provide a service. By way of example, mobile service-offering device 104 may be a moveable coffee maker which provides a coffee brewing service, mobile service-offering device 104 may be a moveable sonography machine which provides a may be used to generate sonograms, or mobile service-offering device 104 may be a moveable conferencing device that supports video and/or audio conferencing. It should be appreciated that mobile service-offering device 104 may either be in the process of moving or may effectively be substantially stationary, i.e., not currently moving, at a time when it is determined whether a user device 112a-c is in proximity to mobile service-offering device 104.

Mobile service-offering device 104 has a zone of impact 108, e.g., an associated range. In the described embodiment, when a user device 112a, 112b is within zone of impact or range 108, user device 112a, 112b may be considered to be in proximity to mobile service-offering device 104. Generally, zone of impact or range 108 is defined with respect to mobile service-offering device 104. Zone of impact or range 108 may be defined by a radius around mobile service-offering device 104, and the radius may generally radiate from mobile service-offering device 104 in any direction. For example, zone of impact or range 108 may be substantially planar and defined relative to an xy-plane. It should be appreciated that zone of impact or range 108 is generally predefined, and may vary depending upon factors including, but not limited to including, the location of mobile service-offering device 104 and the services offered by mobile service-offering device 104.

Server node 116 includes an MSE 120, a datastore 124, a communications interface 128, and a processing arrangement 132. In one embodiment, MSE 120 includes hardware and/or software logic configured to detect the presence of mobile service-offering device 104, to detect when a user device 112a-c is in proximity to mobile service-offering device 104, and to determine whether there is available information to offer to a user device 112a-c that is in proximity to mobile service-offering device 104 as appropriate. It should be appreciated that, in some instances, MSE 120 may be arranged to detect substantially only user devices 112a-c that are effectively registered within network 100. MSE 120 is also generally configured to present appropriate information to users using user devices 112-c. One embodiment of an MSE will be discussed in more detail with respect to FIG. 2.

Server node 116, which communicates with user devices 112a-c, includes a data store 124 that stores information or content associated with mobile service-offering device 104 that may be presented to user devices 112a-c which are dwelling within range 108, e.g., user device 112a and user device 112b. Data store 124 generally includes memory, and information stored in data store 124 may be stored such that the information is indexable. In one embodiment, data store 124 may be a relational database.

Server node 116 also includes a communications interface 128 that allows server node 116 to communicate within network 100. Communications interface 128 may include input/output (I/O) ports (not shown) and logic that allows server node 116 to send and to receive information through network 110. A processing arrangement 132 of server node 116 allows logic associated with server node 116 to execute. By way of example, processing arrangement 132 may execute logic associated with MSE 120 to cause information to be sent and/or received within network 100.

User devices 112a-c may generally be any suitable device that may communicate within network 100, and may be carried and used by a user (not shown). For example, user devices 112a-c may include, but are not limited to including, mobile phones, computing devices such as laptop computers and tablet computers, digital media players, personal digital assistants, and the like. Typically, a user device 112a-c includes at least one presentation arrangement that allows information to be presented using the user device 112a-c. A presentation arrangement may allow for information to be presented visually and/or audibly such that a use, may view and/or listen to the information. For example, a user device 112a-c may be arranged to allow an electronic manual which describes how to operate mobile service-offering device 104 to be presented thereon.

Users of user devices 112a-c may generally be considered to be consumers of services associated with mobile service-offering device 104. However, it should be understood that users of user devices 112a-c are not limited to being consumers of services associated with mobile service-offering device 104. In one embodiment, users of user device 112a-c may be parties who provide a service to mobile service-offering device 104. By way of example, a user of user device 112a-c may be a maintenance worker who is tasked with maintaining or otherwise servicing mobile service-offering device 104.

When user device 112a moves into zone of impact or range 108 and remains within zone of impact or range 108 for more than a predetermined amount of time, e.g., a threshold amount of time, then user device 112a is considered to be dwelling within zone of impact or range 108 or within proximity to mobile service-offering device 104. The amount of time user device 112a has been within zone of impact or range 108 and, thus, effectively in proximity to mobile service-offering device 104 may be considered to be a "dwell time." It should be appreciated that when both mobile service-offering device 104 and user device 112a move, as long as user device 112a remains within zone of impact or range 108 for more than a threshold amount of time, user device 112 may be considered to be dwelling within zone of impact or range 108.

In the embodiment as shown, user device 112a has been dwelling within zone of impact or range 108 for more than a threshold amount of time. As a result, upon detecting or otherwise determining that user device 112a has been within zone of impact or range 108 and, therefore, in proximity to mobile service-offering device 104 for more than a threshold amount of time, MSE 120 may notify user device 112a that information relating to mobility service-offering device 104 is available. Such information, which may be in the form of an electronic manual or a "cheat sheet" which describes the operation of mobile service-offering device 104, may be presented on user device 112a. Thus, user device 112a is effectively provided with useful information which allows a user associated with user device 112a to interact with, e.g., utilize, mobile service-offering device 104 in an efficient manner.

In general, MSE 120 may provide, e.g., push, different information to different user devices 112a-c, even when user devices 112a-c are all substantially at the same location. MSE 120 may provide one set of information to user device 112a and another set of information to user device 112b, even though both user device 112a and user device 112b are within zone of impact or range 108. For example, when mobile service-offering device 104 is a piece of hospital equipment, if user device 112a belongs to a doctor and user device 112b belongs to a patient, it may be appropriate to provide the doctor with electronic manuals associated with the operation of mobile service-offering device 104 and to provide the patient with information that explains what mobile service-offering device 104 is. MSE 120 may use identifiers associated with user devices 112a-c, e.g., service set identifiers (SSIDs) and/or media access control (MAC) addresses, and the identity of users of user devices 112a-c to identify the information to provide to each user device 112a-c.

Figure 2:
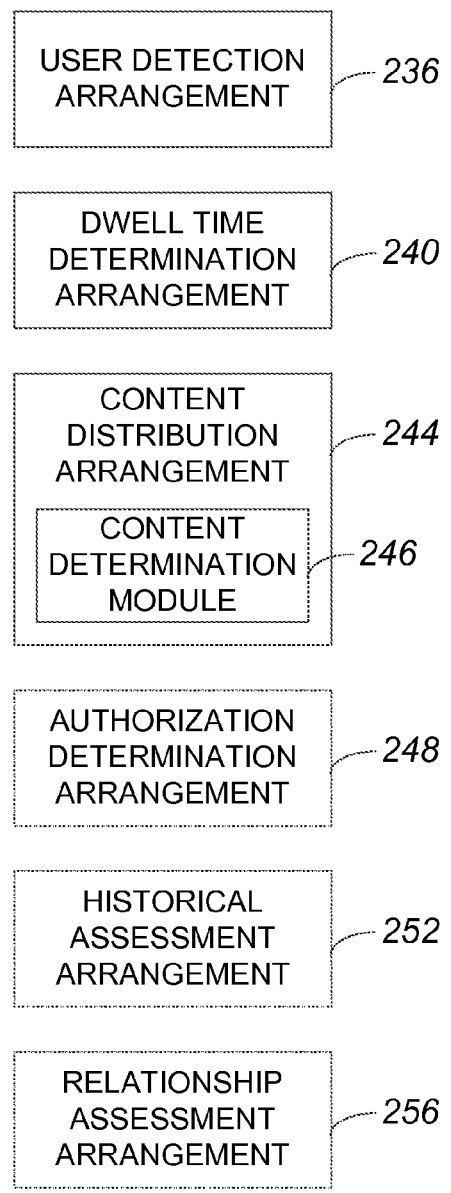
FIG. 2 is a block diagram representation of an MSE in accordance with an embodiment.

An MSE within a network may be part of a server node, as described above with respect to FIG. 1, or may be a part of a mobile service-offering or provider device. FIG. 2 is a block diagram representation of an MSE in accordance with an embodiment. An MSE 220, which may generally be embodied as hardware and/or software logic, includes a user detection arrangement 236. User detection arrangement 236 is arranged to detect or to determine when a user device is in proximity to a mobile service-offering or provider device, e.g., when a user device is within a range defined substantially around a mobile service-offering or provider device. User detection arrangement 236 may include sensing components which sense when a user device is in proximity to a mobile content provider device, and/or may be arranged to process data obtained from the user device or the mobile content provider device to ascertain when the user device is in proximity to the mobile content provider device. In one embodiment, user detection arrangement 236 may obtain an indication sent by a user device and/or a mobile content provider device and determine whether the user device is in proximity to the mobile content provider device based on the indication. It should be appreciated that user detection arrangement 236 may, in some instances, be configured to substantially only detect when user devices that are effectively registered with MSE 220 are in proximity to a mobile content provider device. That is, in some instances, user devices which are unknown to, e.g., not registered with, MSE 220 may not be detected by user detection arrangement 236 when such user devices are in proximity to a mobile content provider device.

MSE 220 also includes a dwell time determination arrangement 240 that is configured to determine how long a user device has been detected in proximity to a mobile content provider device. Dwell time determination arrangement 240 is also, in the described embodiment, configured to ascertain whether a dwell time exceeds a threshold amount of time and to effectively identify a user device as being suitable for receiving content associated with a mobile content provider device when the dwell time exceeds the threshold amount of time.

A content distribution arrangement 224 is generally configured to obtain content relating to a mobile content provider device when a user device has been in proximity to the mobile content provider device for more than a threshold amount of time, and to distribute the obtained content to the user device. The content may include information presented audibly and/ or visually. In one embodiment, content may include an application, e.g., a remote control application that allows a mobile content provider device to be controlled using a user device.

Content distribution arrangement 224 may access a data store to obtain appropriate content. A content determination module 246 is arranged to determine which content relating to a mobile content provider device is appropriate to distribute to a user device. Content determination module 246 may process any number of different factors when determining which content to distribute to a user device. The different factors may include, but are not limited to including, an authorization level of a user device, historical behavior patterns associated with the user device, a job title of a user of the user device, and an actual geographic location of the user device and a mobile content provider device.

An optional authorization determination arrangement 248 is configured to determine an authorization level of a user device, and may provide information to content determination module 246 relating to the authorization level of the user device. In one embodiment, authorization determination arrangement 248 may determine an authorization level of a user device based on a job held by a user of the user device.

A historical assessment arrangement 252 obtains historical information, as for example from a data store, which indicates what types of content or information were accessed using a user device when the user device was previously in proximity to a mobile content provider device or another device similar to the mobile content provider device. For example, if a mobile content provider device is a coffee maker and historical information indicates that a user device has historically been used to access information on how to brew a particular kind of coffee, then historical assessment arrangement 252 may provide an indication to content determination module 246 that enables content determination module 246 to ascertain that content relating to how to brew the particular kind of coffee is appropriate for the user device.

In one embodiment, historical assessment arrangement 252 may determine that based on historical information, it is unlikely that a user of a user device would prefer to receive a particular type of content. By way of example, if historical information indicates that a particular user device is in proximity to a particular mobile content provider device multiple times each day, historical assessment arrangement 252 may determine that content that describes the operation of the mobile content provider device is likely not desired by a user of the user device. Similarly, if historical information indicates that a particular user device has been in proximity of a particular mobile content provider more than a particular amount of times, historical assessment arrangement 252 may determine that content that describes the operation of the mobile content provider device is likely not desired by a user of the user device.

An optional relationship assessment arrangement 256 may generally ascertain a relationship between a user device and a mobile content provider device when the user device is in proximity to the mobile content provider device. Based on the relationship between the user device and the mobile content provider device, relationship assessment arrangement 256 may provide an indication to content determination module 246 which allows content determination module 246 to determine appropriate content to essentially offer to the user device. For example, a user device in the possession of a doctor may have one kind of relationship with a mobile content provider device that is a sonography machine, and a user device in the possession of a patient may have a different kind of relationship with the sonography machine. Relationship assessment arrangement 256 may determine that a doctor may operate a sonography machine while a patient may effectively receive services from the sonography machine.

Figure 3A:
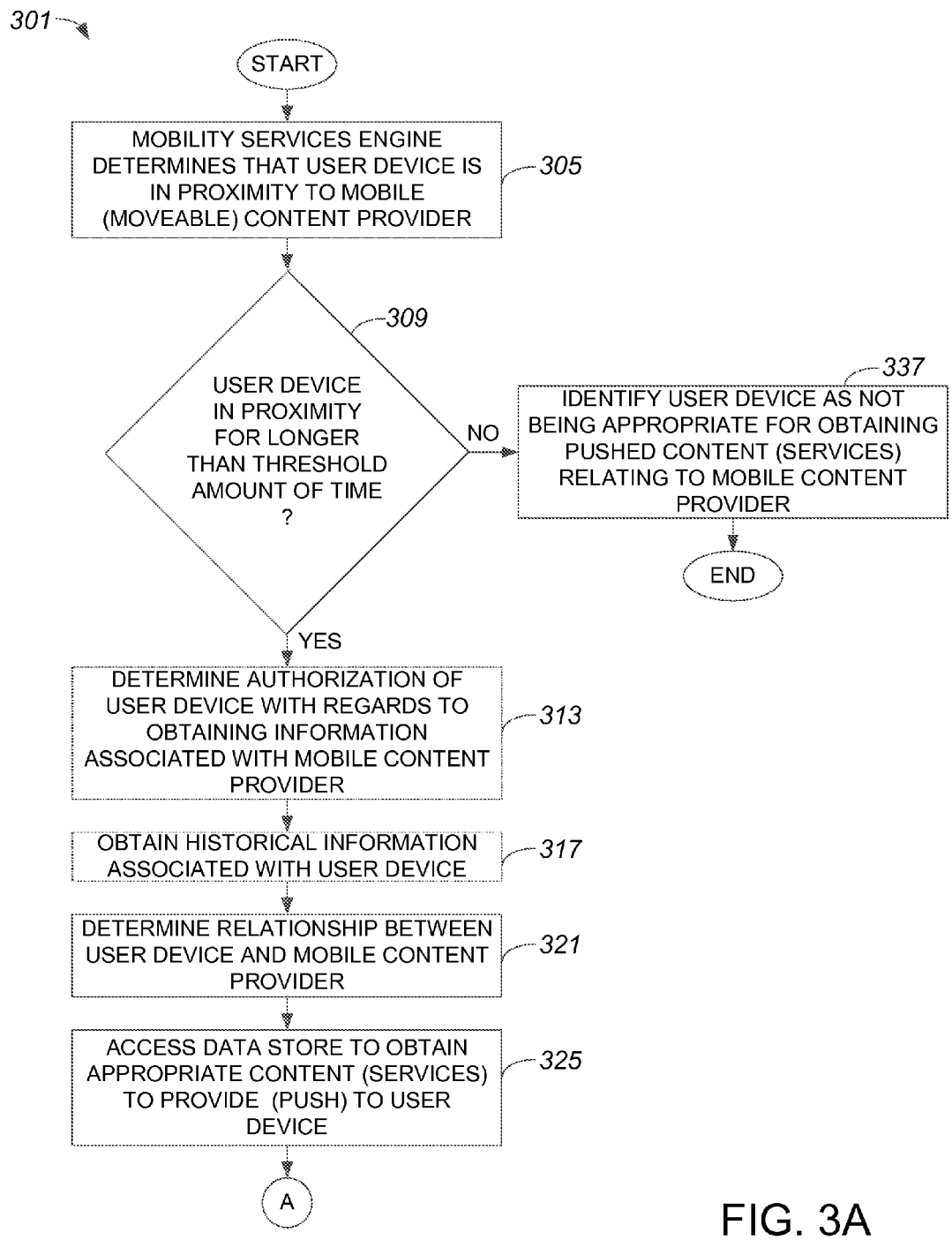
FIGS. 3A and 3B are a process flow diagram which illustrates a method of obtaining and providing appropriate content or services to a user device based on an amount of time the user device is in proximity to a mobile provider in accordance with an embodiment.
Figure 3B:
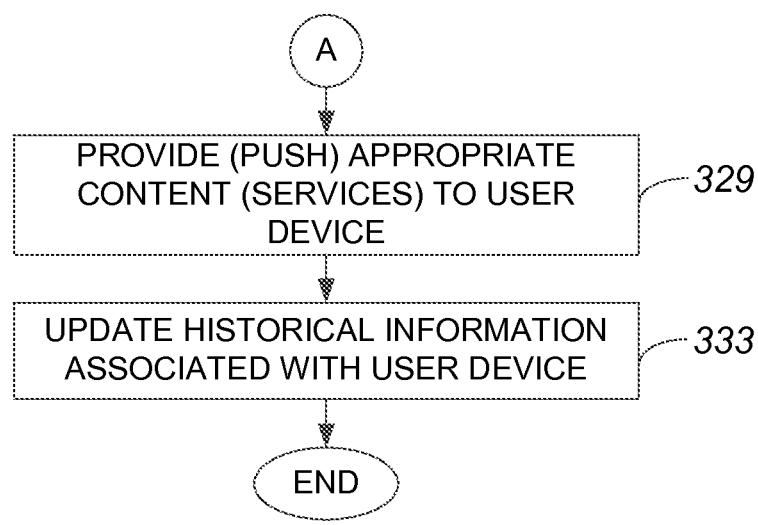

In general, a MSE within an overall communications network may effectively determine when a user device may be considered to be dwelling in proximity to a mobile or moveable provider, and then cause appropriate content and/or services to be provided to the user device and, hence, a user of the user device. When the amount of time the user device remains within a proximity of a mobile content provider exceeds a particular amount time, or when the dwell time of the user device exceeds the particular amount of time, then the user device may effectively be offered appropriate content or services relating to the mobile content provider. With reference to FIGS. 3A and 3B, a process flow diagram which illustrates a method of obtaining and providing appropriate content or services to a user device based on an amount of time the user device is in proximity to a mobile content provider will be described in accordance with an embodiment. A method 301 of obtaining and providing appropriate content or services to a user device begins at step 305 in which a MSE determines that a user device is in proximity to a mobile content provider. A MSE may determine that a user device is in proximity to a mobile content provider upon obtaining information from the user device and/or the mobile content provider. While the MSE may use information obtained from the user device and/or the mobile content provider to make calculations which indicate that the user device is in proximity to the mobile content provider, the MSE may instead substantially directly obtain an indication from the user device and/or the mobile content provider that indicates that the user device is in proximity to the mobile content provider.

As discussed above, the location of a user device relative to a mobile content provider such that the user device is considered to be in proximity to the mobile content provider may vary widely. In one embodiment, a user device may be considered to be in proximity to a mobile content provider when the user device is located within a predetermined distance from the mobile content provider, e.g., within a predetermined radius from the mobile content provider. It should be appreciated that a distance from a mobile content provider that effectively defines a range within which a user device may be considered to be in proximity to the mobile content provider may be either substantially symmetric or substantially asymmetric. For example, for a mobile content provider positioned in a center of a room, a substantially symmetric range within which a user device is considered to be in proximity from the mobile content provider may effectively be defined by a radial distance from the mobile content provider that is substantially the same in every suitable direction. A radial distance may be substantially planar or defined relative to an xy-plane. Alternatively, a radial distance may be substantially three-dimensional or defined relative to an x-direction, a y-direction, and a z-direction. When a mobile content provider has a first side positioned substantially against a wall, then a range within which a user may be considered to be in proximity to the mobile content provider may be defined relative to the wall, e.g., a user device that is on the other side of the wall from the first side may be considered to not be in proximity to the mobile content provider.

After a MSE determines that a user device is in proximity to a mobile content provider, it is determined in step 309 whether the user device has been in proximity to or within a zone of impact of the mobile content provider for longer than a threshold amount of time. That is, a determination is made as to whether a dwell time associated with the user device essentially exceeds the threshold amount of time or an otherwise predetermined amount of time is used to effectively define when a user device is considered to be dwelling, e.g., pausing or otherwise located, at or near a mobile content provider. It should be appreciated that the MSE may poll itself, e.g., periodically poll, the user device, and/or the mobile content provider to ascertain when the amount of time the user device is in proximity to the mobile content provider exceeds the threshold amount of time.

If it is determined in step 309 that the user device is not in proximity to the mobile content provider for longer than the threshold amount of time, the indication is that the user device is not currently in proximity to the mobile content provider. It should be appreciated that the determination of whether a user device has been in proximity to a mobile content provider may generally vary widely. For example, an MSE may effectively obtain information which indicates how long a user device has currently been in proximity to a mobile content provider. When the determination in step 309 is that the user device has not been in proximity for longer than a threshold amount of time, then process flow proceeds to step 337 in which the MSE identifies the user device as not being appropriate for obtaining pushed contents or services relating to the mobile content provider, and the method of providing appropriate content or services to a user device is completed.

Alternatively, if it is determined in step 309 that the user device has been in proximity for longer than the threshold amount of time, the implication is that the user may obtain or otherwise receive contents or information relating to the mobile content provider. Accordingly, in step 313, an authorization of the user device with regards to obtaining information associated with the mobile content provider is determined. Identifying appropriate information or content for a user device may include, but is not limited to including, identifying an access privilege level associated with the user device. That is, identifying appropriate information or content that may be provided to the user device may include determining what sort of information or content a user who is associated with the user device is authorized, or otherwise entitled, to obtain.

From step 313, process flow moves to an optional step 317 in which historical information associated with a user device may be obtained. The historical information associated with the user device may include an indication of which types of information or content the user device has previously effectively consumed. For example, if a mobile content provider is a coffee maker and a user device has previously been used to view a page of an electronic manual which describes making espresso, the historical information for the user device may indicate that the user device has been used in the past to consume a section of the electronic manual which describes making espresso.

In step 321, a relationship between a user device and a mobile content provider may be determined, e.g., through obtaining information from a database. Although some embodiments allow substantially the same content associated with a mobile content provider to be provided to all user devices within proximity to the mobile content provider, other embodiments may cause different content to be provided to different user devices depending upon the relationships between the mobile content provider and the different user devices. By way of example, within an enterprise, a user device owned by a maintenance worker may be used to deliver content based on maintaining a mobile content provider, while a user device owed by a high-ranking official within the enterprise may be used to deliver content based on using the mobile content provider.

After a relationship between a user device and a mobile content provider is determined, a data store is accessed in step 325 to obtain appropriate content or services to provide, e.g., push, to the user device. The appropriate content or services may generally be any suitable content or services. Suitable content or services may include, but is not limited to including, information associated with the user device and/or the mobile content provider, information associated with a relationship between the user device and the mobile content provider, information that a user of the user device is expected to find useful based at least in part on historical information, and/or information that the user device is authorized to access.

Once the data store is accessed, appropriate content or services is provided or pushed to the user device in step 329. The content or services may be provided, but are not limited to being provided, by way of a link to a webpage, a link to a document, text, audio, and/or video. In one embodiment, a user device may have to effectively accept the appropriate content or services before the content or services are be provided. After the appropriate content or services is provided to the user device, historical information associated with the user device is updated in step 333 based on the content provided to the user device, and the method of obtaining and providing appropriate content or services to a user device is completed. Updating the historical information may include updating information stored in a data store.

Figure 4:
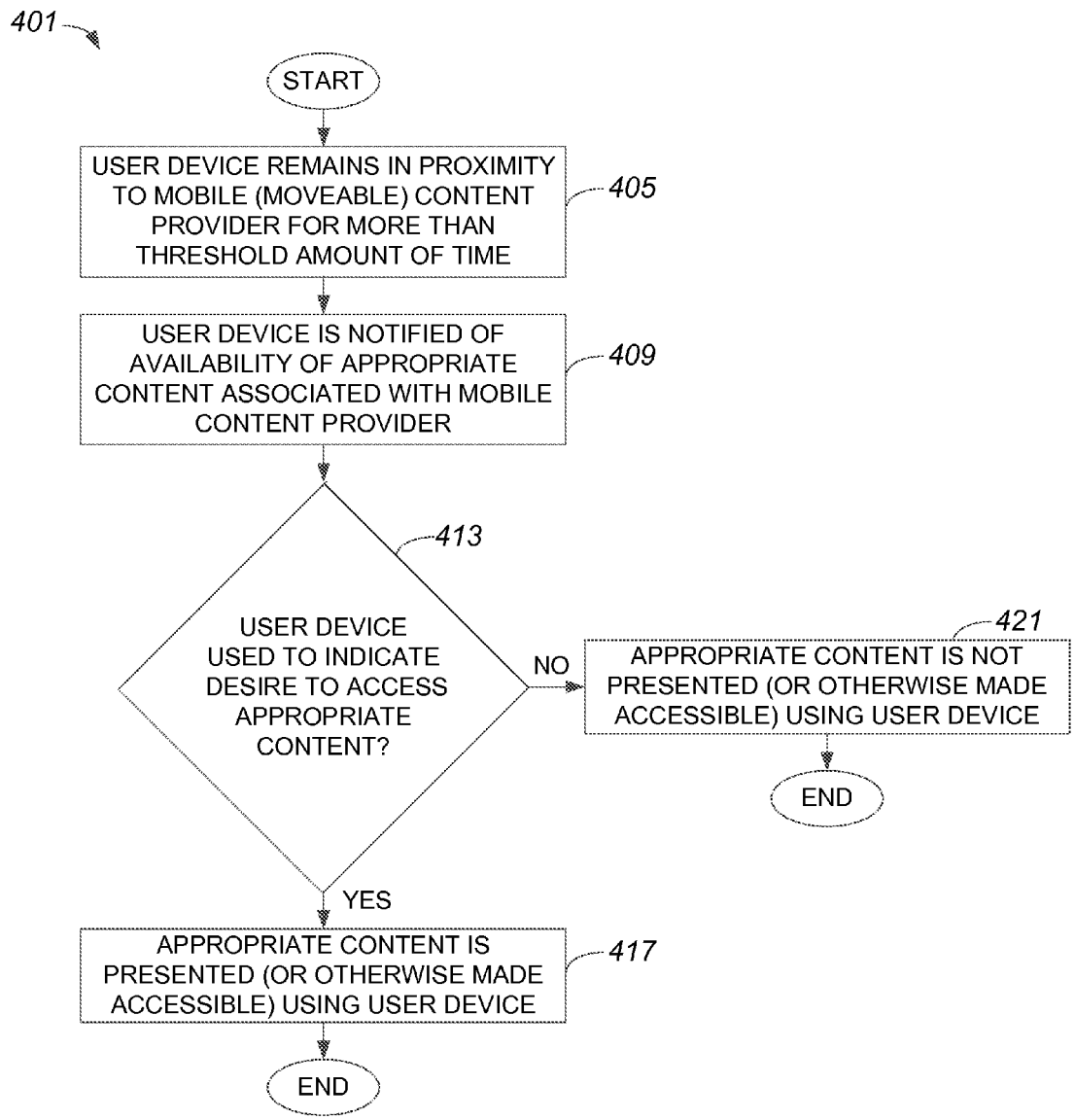
FIG. 4 is a process flow diagram which illustrates a method of obtaining appropriate content or services on a user device when the user device dwells in proximity to a mobile provider for more than a threshold amount of time in accordance with an embodiment.

FIG. 4 is a process flow diagram which illustrates a method of obtaining appropriate content or services on a user device when the user devices dwells in proximity to a mobile content provider form more than a threshold amount of time in accordance with an embodiment. A method of obtaining appropriate content or services on a user device begins at step 405 in which the user device remains in proximity to a mobile, or moveable, provider for more than a particular amount of time, e.g., a threshold amount of time. That is, the user device is detected as dwelling in proximity to the mobile content provider. For example, when a user device is detected in proximity to a mobile content provider such as a phone, a coffee maker, or a sonography machine, for more than a threshold amount of time, the user device may be identified as dwelling in proximity to the mobile content provider.

Once the user device is detected as being in proximity to the mobile content provider for more than a threshold amount of time, i.e., once a dwell time associated with the user device exceeds the threshold amount of time, the user device is notified of the availability of appropriate content associated with the mobile content provider in step 409. The user device may be notified when information, e.g., a message, is sent to the user device. Such information may be sent from substantially any suitable source including, but not limited to including, a server node on which a MSE is executing or the mobile content provider. In one embodiment, the information may be a link to a webpage or a document that presents information associated with using the mobile content provider. It should be appreciated that when the user device is notified of the availability of appropriate content, the user device may alert a user who possesses the user device of the availability of appropriate content, e.g., through an audio indication and/or a visual indication such as a pop-up window presented using the user device.

In step 413, it is determined whether the user device is used to indicate a desire, as for example a desire by a user of the user device, to access appropriate content. A determination of whether a user device is used to indicate a desire to access appropriate content or services may include, but is not limited to including, a determination of whether a user has pressed an appropriate key on the user device, selected an appropriate link on the user device, and/or otherwise taken a suitable action using the user device to indicate whether the user desires access to the appropriate content.

If the determination in step 413 is that the user device has not been used to indicate a desire to access appropriate content or services, the implication may be that a user of the user device does not wish to access appropriate content or services. Accordingly, process flow moves from step 413 to step 421 in which appropriate content or services is not presented, or otherwise made accessible, using the user device. The method of obtaining appropriate content or services on a user device is completed once appropriate content is not presented using the user device.

Alternatively, if it is determined in step 413 that the user device is used to indicate a desire to access appropriate content or services, the appropriate content is presented, or otherwise made accessible, using the user device in step 417. It should be appreciated that presenting appropriate content may include displaying visual content on a display screen of the user device and/or providing audio content using the user device. After appropriate content is presented, the method of obtaining appropriate content or services is completed.

Although only a few embodiments have been described in this disclosure, it should be understood that the disclosure may be embodied in many other specific forms without departing from the spirit or the scope of the present disclosure. By way of example, when a user device which has been identified as dwelling in the vicinity of a mobile content provider for more than a threshold amount of time is no longer detected as being in the vicinity of the mobile content provider, the ability to access appropriate content may be withdrawn. For instance, if a user has not indicated a desire to access appropriate content prior to a user device moving away from being in proximity to a mobile content provider, the ability to access appropriate content may be withdrawn substantially as soon as the user device is no longer identified as being in proximity to the mobile content provider.

Content associated with a mobile content provider or mobile service-offering device may generally be provided by a maker and/or a vendor of the mobile content provider or mobile service-offering device. For example, an electronic manual, a cheat sheet, a service, and/or service information may be created by a maker and/or a vendor and then made available within a network. Such content may be stored in a data store, e.g., a relational database, which may be searched when appropriate.

While the proximity of a user device to a mobile content provider has generally been described as relating to the presence of the user device in a range around the mobile content provider, the proximity of the user device to the mobile content provider is not limited to relating to the presence of the user device in the range around the mobile content provider. For instance, a range may instead be defined with respect to, e.g., around, a user device such that the user device is considered as being in proximity to the mobile content provider when the mobile content provider is within the range defined with respect to the user device.

It should be appreciated that, in one embodiment, a window of time during which a user device may be used to indicate a desire to access appropriate content may be set. In such an embodiment, if no indication is provided regarding whether access to appropriate content is desired within the window of time, the ability to access appropriate content may effectively be withdrawn. For example, a link to a webpage or a document that includes information relating to a mobile content provider may no longer be displayed on the user device once a window of time during which a user device may be used to indicate a desire to access appropriate content essentially expires.

In one embodiment, the availability of appropriate content pertaining to a mobile content provider may be accessible using a user device substantially only when the user device remains in proximity to the mobile content provider. By way of example, a user device may be used to display a manual associated with a mobile content provider substantially only when the user device remains in proximity to the mobile content provider. When the user device on which the manual is displayed is no longer in proximity to the mobile content provider, the manual may no longer be displayed. In some instances, however, it should be understood that a manual displayed on a user device may remain displayed on the user device even after the user device is no longer considered to be in proximity to a mobile content provider without departing from the spirit or the scope of this disclosure.

While a user has generally been described as having an ability to determine whether to utilize a user device to access appropriate content associated with a mobile content provider, appropriate content may instead be substantially automatically presented on the user device. That is, once a user device has been identified as dwelling in proximity to a mobile content provider, appropriate content associated with the mobile content provider may effectively be pushed to the user device. For instance, an electronic manual associated with the operation of a mobile content provider may substantially automatically be displayed on a user device that has been identified as dwelling in proximity to the mobile content provider.

In lieu of providing content or services based on a mobile content provider and a user device being in proximity to each other for more than a predetermined amount of time, content or services may be provided based on two user devices being in proximity to each other for more than a predetermined amount of time. By way of example, if a plurality of user devices is known to belong to persons who are both associated with a project, when the plurality of user devices are within proximity of each other for more than a predetermined amount of time, information relating to the project may be provided to the plurality of user devices.

A determination of whether a user device is in proximity to a mobile content provider may be based on the identity of the user device, e.g., based on who or what owns the user device. For instance, a user device associated with a first user may be deemed to be in proximity to a particular mobile content provider if it is at a first distance from the particular mobile content provider, while a user device associated with a second user may be deemed to be in proximity to the particular mobile content provider if it is at a second distance from the particular mobile content provider. In other words, some user devices may need to be closer to a mobile content provider to be considered to be in proximity to that mobile content provider than other user devices. It should be appreciated that the parameters used to define proximity to a mobile content provider may vary, in one embodiment, based upon the identity of the user device.

While a MSE has been described as determining whether there is appropriate content to effectively offer to a user of a user device in proximity to a mobile content provider, it should be appreciated that any suitable system may generally determine whether there is appropriate content to effectively offer to a user of a user device in proximity to a mobile content provider. Further, any suitable system may also provide appropriate content to a user device that is in proximity to a mobile content provider without departing from the spirit or the scope of the disclosure.

A mobile content provider may generally be associated with a network by provisioning the mobile content provider, or otherwise substantially registering the mobile content provider with the network. When a network is associated with a building, a mobile content provider may generally be associated with the network, but may be provisioned such that the mobile content provider is statically identified with a particular portion, e.g., floor, of the building. For example, a mobile content provider may initially be provisioned with respect to a particular location, and once the mobile content provider is provisioned, a network may then monitor the movement of the mobile content provider. Alternatively, metadata within a network may identify a mobile content provider with respect to a particular portion of a building associated with a network. Typically, a general location of a mobile content provider and services provided by the mobile content provider may be known, and when the mobile content provider moves, an MSE may be able to track where the mobile content provider has moved. Such tracking may be performed by, but is not limited to being performed by, tracking an address such as a MAC address of the mobile content provider and utilizing location detection capabilities within a network. Network capabilities, e.g., Wi-Fi capabilities, may be associated with a mobile content provider to enable tracking of the mobile content provider.

The embodiments may be implemented as hardware and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   identifying when a user device is in proximity to a moveable device;
   determining a first amount of time the user device has been in proximity to the moveable device;
   determining whether the first amount of time exceeds a threshold amount of time;
   accessing content associated with the moveable device when it is determined that the first amount of time exceeds the threshold amount of time; and
   providing at least an indication of content to the user device when it is determined that the first amount of time exceeds the threshold amount of time.

2. The method of claim 1 wherein the content includes a service associated with the moveable device.

3. The method of claim 1 wherein providing at least the indication of the content to the user device includes providing the content to the user device.

4. The method of claim 3 wherein the content includes one selected from a group including instructions associated with using the moveable device, instructions associated with maintaining the moveable device, and instructions associated with utilizing a service provided by the moveable device.

5. The method of claim 1 wherein providing at least the indication of the content to the user device includes enabling the user device to be used to specify whether the content is desired, and wherein the method further includes:
    determining whether an indication that the content is desired is obtained; and
    presenting the content using the user device when the indication that the content is desired is obtained.

6. The method of claim 1 further including:
    determining when the user device is authorized to obtain the content, wherein at least the indication of the content is provided when the user device is authorized to obtain the content.

7. The method of claim 1 further including:
    obtaining historical information associated with the user device and with the moveable device;
    determining whether the historical information indicates that the content is to be provided to the user device, wherein at least the indication of the content is provided when it is determined that the historical information indicates that the content is to be provided to the user device.

8. A tangible, non-transitory computer-readable medium comprising computer program code, the computer program code, when executed, configured to:
    identify when a user device is in proximity to a moveable device;
    determine a first amount of time the user device has been in proximity to the moveable device;
    determine whether the first amount of time exceeds a threshold amount of time;
    access content associated with the moveable device when it is determined that the first amount of time exceeds the threshold amount of time; and
    provide at least an indication of content to the user device when it is determined that the first amount of time exceeds the threshold amount of time.

9. The tangible, non-transitory computer-readable medium comprising computer program code of claim 8 wherein the content includes a service associated with the moveable device.

10. The tangible, non-transitory computer-readable medium comprising computer program code of claim 8 wherein providing at least the indication of the content to the user device includes providing the content to the user device.

11. The tangible, non-transitory computer-readable medium comprising computer program code of claim 10 wherein the content includes one selected from a group including instructions associated with using the moveable device, instructions associated with maintaining the moveable device, and instructions associated with utilizing a service provided by the moveable device.

12. The tangible, non-transitory computer-readable medium comprising computer program code of claim 8 wherein the computer program code operable to provide at least the indication of the content to the user device includes enabling the user device to be used to specify whether the content is desired, and wherein the computer program code is further configured to:
    determine whether an indication that the content is desired is obtained; and
    present the content using the user device when the indication that the content is desired is obtained.

13. The tangible, non-transitory computer-readable medium comprising computer program code of claim 8 wherein the computer program code is further configured to:
    determine when the user device is authorized to obtain the content, wherein at least the indication of the content is provided when the user device is authorized to obtain the content.

14. The tangible, non-transitory computer-readable medium comprising computer program code of claim 8 wherein the computer program code is further configured to:
    obtain historical information associated with the user device and with the moveable device;
    determine whether the historical information indicates that the content is to be provided to the user device, wherein at least the indication of the content is provided when it is determined that the historical information indicates that the content is to be provided to the user device.

15. An apparatus comprising:
    means for identifying when a user device is in proximity to a moveable device;
    means for determining a first amount of time the user device has been in proximity to the moveable device;
    means for determining whether the first amount of time exceeds a threshold amount of time;
    means for accessing content associated with the moveable device when it is determined that the first amount of time exceeds the threshold amount of time; and
    means for providing at least an indication of content to the user device when it is determined that the first amount of time exceeds the threshold amount of time.

16. An apparatus comprising:
    a communications interface, the communications interface being arranged to enable communications within a network, the network including at least one moveable service-offering entity and at least one user device;
    a data store; and
    a mobility services engine (MSE), the MSE being configured to determine when the moveable service-offering entity and the user device are in proximity to each other for at least a predetermined amount of time, wherein the MSE is further configured to identify a first content stored in the data store that is appropriate for the user device when it is determined that the moveable service-offering entity and the user device are in proximity to each other for at least the predetermined amount of time and to provide the first content to the user device, the first content being associated with the moveable service-offering entity.

17. The apparatus of claim 16 wherein the MSE is further configured to assess historical information relating to the user device and the moveable service-offering entity, and wherein the MSE is still further to configured to identify the first content stored in the data store that is appropriate for the user device using the historical information.

18. The apparatus of claim 17 wherein the historical information is stored in the data store, and wherein the MSE obtains the historical information from the data store.

19. The apparatus of claim 16 wherein the MSE is further configured to assess a relationship between the user device and the moveable service-offering entity, and wherein the MSE is still further to configured to identify the first content stored in the data store that is appropriate for the user device based on the relationship.

20. The apparatus of claim 16 wherein the MSE is further configured to determine an authorization level associated with the user device, the authorization level being arranged to indicate which types of content are accessible to the user device, and wherein the MSE is still further to configured to identify the first content stored in the data store that is appropriate for the user device based on the authorization level.

21. The apparatus of claim 16 wherein the MSE is still arranged to provide the first content to the user device by presenting the first content using the user device.

* * * * *